July 8, 1941.   K. SCHLESINGER   2,248,552
INTERLACED LINE SCANNING OF FILMS RUNNING
ASYNCHRONOUSLY WITH THE SCANNING MEANS
Filed Dec. 23, 1937   2 Sheets-Sheet 1

Inventor:
Kurt Schlesinger.

Patented July 8, 1941

2,248,552

UNITED STATES PATENT OFFICE 2,248,552

INTERLACED LINE SCANNING OF FILMS RUNNING ASYNCHRONOUSLY WITH THE SCANNING MEANS

Kurt Schlesinger, Berlin, Germany, assignor, by mesne assignments, to Loewe Radio, Inc., a corporation of New York Application December 23, 1937, Serial No. 181,319
In Germany December 24, 1936

4 Claims. (Cl. 178—7.6)

The present invention relates to television and more particularly to apparatus for scanning a continuously moved film according to the so called "interlaced line method."

When the scanning point has completed its vertical movement twice, while the film is displaced to the extent of one image, a complete interlaced line scanning of this one image is performed, assuming the number of lines to be an odd one. This simple case occurs, for example, if the scanning device is driven by 50-cycles lighting mains, whilst the film is running at 25 images per second.

In practice, however, it may occur that the mains frequency and the desired frame frequency do not coincide. In the U. S. A., for example, the frequency of the lighting mains is 60 cycles per second, whilst 24 images per second is the prescribed normal speed of a sound film. In these cases, therefore, the movement of the film and the movement of the scanning point are asynchronous to each other.

It is an object of the invention to solve the problem of transmitting more scannings, i. e. part-images per second than film images are running per second, by means of a scanning device producing a peculiar track of the scanning point on the film.

Another object of the invention is a scanning disc for producing this track.

Figure 1:
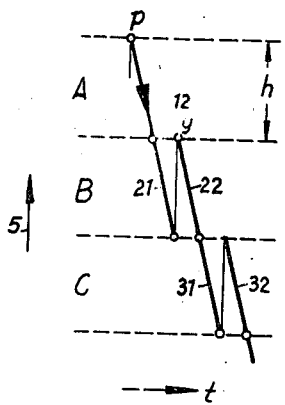
Figure 2:
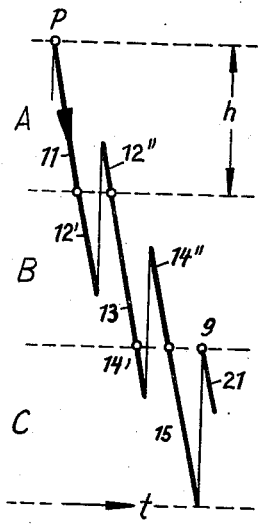
Figure 3:
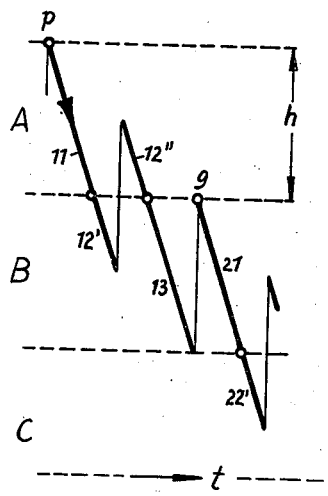
Figure 4:
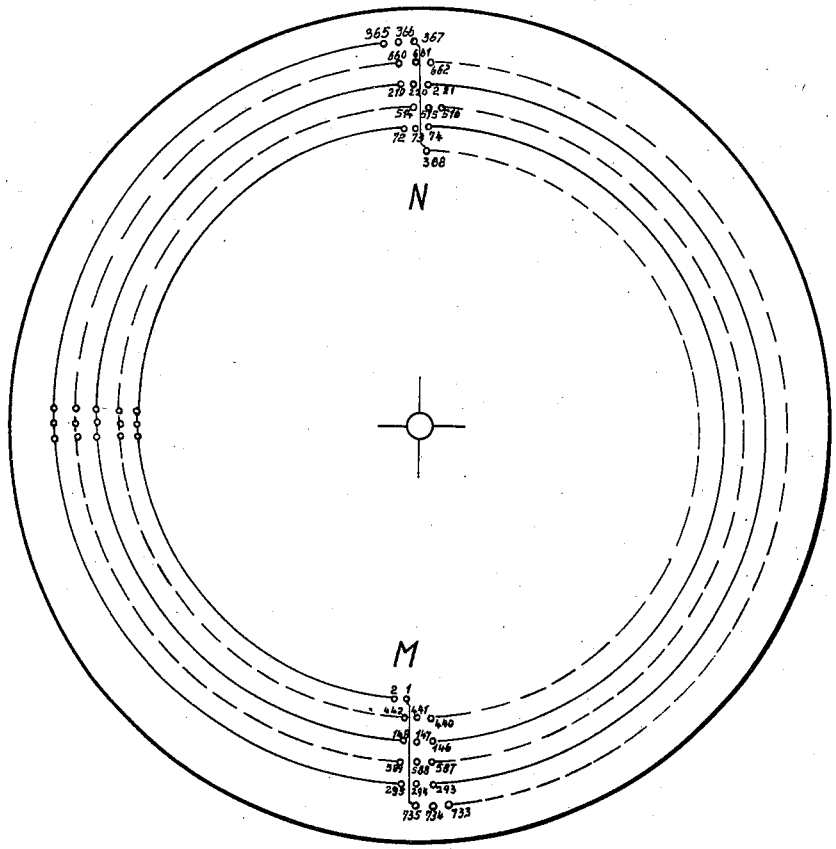

The invention will be best understood by reference to the following description taken in connection with the accompanying drawings, in which Fig. 1 is a diagram of the longitudinal component of the track the scanning point describes on the film according to a usual method of interlaced scanning, whilst Figs. 2 and 3 show similar diagrams according to the invention, and Fig. 4 is a view of a scanning disc for carrying out the invention.

Fig. 1 serves only for the sake of comprehension of the following figures and relates to the case of an ordinary interlaced scanning at two fields per image or frame. The film runs upwards (arrow 5), the scanning point, in the times of action, downwards. The curve represents only the vertical component of the scanning movement on the film, stretched out horizontally according to the time abscissa $t$. A, B, C represent three succeeding film images, each having the height $h$. The scanning point begins its movement at $p$, describes the tracks 12—21, returns with infinite speed to $g$ and so on. Of course, on the screen the point describes only the distance $h$ during one image period, the film also the distance $h$ in opposite direction, so that the resulting vertical movement or deflection of the point on the film is equal $2h$. One complete period endures from $p$ to $g$. The vertical deflections 21—22, 31—32 and so on correspond to the two fields of the single images. The minute circles indicate the times at which the field synchronisation impulses are transmitted. This scheme is, of course, not claimed.

Fig. 2 shows how this scheme has to be altered in order to fulfil the U. S. A. conditions. Within the complete period $p$—$g$, corresponding to two film images, i. e. $\frac{1}{12}$ of a second the scanning point covers five times the screen (frequency 60). Its vertical deflections on the film are the three strokes 11—12', 12"—13—14' and 14"—15 or the five scannings 11, 12'—12", 13, 14'—14" and 15 so that within this period two film images are scanned and five fields or 2½ double lined television images or frames are transmitted. A second period begins with 21.

According to Fig. 3 within a period $p$—$g$ of two images three fields 11, 12'—12" and 13 are transmitted, also at two interlaced lines.

Generally, if in a transmission $f_i$ is the film image frequency, $f_r$ the frequency of the transmitted images, $f_e = n \cdot f_r$ the frequency of the transmitted fields, and if $$f_r/f_i = \frac{r}{i}$$

$i$ and $r$ being small integer numbers and $r$ being at least 3, the scanning point must stroke over the screen $s = m - 1$ times per film image, $$m = \frac{n \cdot r}{i}$$

being equal to the number of transmitted fields per film image.

In all figures $n$ is 2. In Fig. 2 $f_i = 24$, $f_r = 30$, $f_e = 60$, $$\frac{r}{i} = \frac{5}{4}$$

$$m = 2 \cdot \frac{5}{4} = \frac{5}{2}$$

$$s = \frac{3}{2}$$

In Fig. 3

$$m = \frac{3}{2}, \ s = \frac{1}{2}$$

Also the case of Fig. 1 (European system) falls under the same rule, $f_i$ being 25 and $f_r=25$ so that $$m = 2 \cdot \frac{25}{25} = 2$$
$$s = 1.$$

A scanning device must now be sought for, which projects the requisite scanning track onto the moving film. For sake of simplicity only the case of Fig. 2 (U. S. A. system) and of a scanning disc may be explained, similar considerations in other cases being easy to be made.

The frequency of the mains being 60, the disc is driven at 90 revolutions per second. This may easily be obtained by means of a rotating frequency transformer. According to Fig. 4 the disc is provided with two spirals, one drawn as a full, the other as a dotted line, of which each includes 2½ turns and merge one into the other at two jumping lines M and N. These spirals must be uncovered alternately by means of an optical interceptor (not shown). As the 2½ turns of each spiral produce one stroke of the scanning point, the duration of a stroke is equal to $$2.5 \cdot \tfrac{1}{90} = \tfrac{1}{36} \text{ of a second}$$

Consequently during the time of movement of one film frame, i. e. $\tfrac{1}{24}$ second, 3/2 scanning strokes $s$ will occur, (or 3 strokes per two film frames) as required above.

It is remarkable that this asynchronous disc according to the invention contains on a spiral division a smaller number of image points than are transmitted. In the case, for example, of 441 lines it possesses on a division merely 369 points. This is brought about by the fact that, as disclosed by Fig. 3, the missing image points are made up by the commencement of the second division of the disc.

I claim:

1. In a television transmitter where the subject matter to be transmitted is derived from a moving picture film that is run at a uniform rate of 24 film frames per second and in which the television images are transmitted in interlaced fashion at 60 fields and 30 frames per second comprising means for scanning the film by a spot of radiant energy, means for vertically moving the scanning spot over the film in a direction opposite to the direction of movement of the film for a distance corresponding to 5/3 of the height of a film frame relative to the film, and means for substantially instantaneously returning the scanning spot in a vertical direction a distance equivalent to the height of one film frame relative to a fixed point, the ratio of vertical deflection cycles to the film frame speed being 3 to 2.

2. In a television transmitter where the subject matter to be transmitted is derived from a moving picture film that is run at a uniform rate of 24 film frames per second and in which the television images are transmitted in interlaced fashion at 60 fields and 30 frames per second comprising means for scanning the film by a spot of radiant energy, means for vertically moving the scanning spot over the film in a direction opposite to the direction of movement of the film for a distance corresponding to 5/3 of the height of a film frame relative to the film, and means for substantially instantaneously returning the scanning spot in a vertical direction a distance equivalent to the height of one film frame relative to a fixed point, the ratio of vertical deflection cycles to the film frame speed being 3 to 2, said means including a scanning disc operating at 90 revolutions per second, said disc having two interlaced spirals of scanning apertures, each spiral occupying approximately 900 degrees and the two spirals being displaced approximately 180 degrees.

3. In a television transmitter for transmitting television images in interlaced fashion at 60 fields and 30 frames per second and in which the subject matter transmitted is derived from a moving picture frame run at a uniform and steady rate of 24 frames per second, comprising means for scanning the film frames by a spot of radiant energy, means for vertically moving the scanning spot relative to the film in a direction opposite to the direction of movement of the film by an amount 5/3 times the height of one film frame and substantially instantaneously vertically returning the scanning spot a distance of one film frame relative to a fixed point, said vertical deflections of the scanning spot being repeated at the rate of 36 per second.

4. In a television transmitter for transmitting television images in interlaced fashion at 60 fields and 30 frames per second and in which the subject matter transmitted is derived from a moving picture frame run at a uniform and steady rate of 24 frames per second, comprising means for scanning the film frames by a spot of radiant energy, means for vertically moving the scanning spot relative to the film in a direction opposite to the direction of movement of the film by an amount 5/3 times the height of one film frame and substantially instantaneously vertically returning the scanning spot a distance of one film frame relative to a fixed point, said vertical deflections of the scanning spot being repeated at the rate of 36 per second, said means including a scanning disc operating at 90 revolutions per second, said disc having two interlaced scanning aperture spirals displaced approximately 180 degrees with respect to each other and each occupying approximately 900 degrees.

KURT SCHLESINGER.